Figure 1:
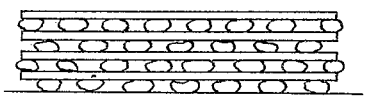

June 6, 1933.  J. A. RENOUPREZ  1,912,401
PROCESS FOR THE MANUFACTURE OF SHEETS
OF DECORATED PLASTIC MATERIAL
Filed July 24, 1929

INVENTOR
Jules A. Renouprez
BY Wm. S. Pritchard
ATTORNEY

Patented June 6, 1933

1,912,401

UNITED STATES PATENT OFFICE

JULES ALBERT RENOUPREZ, OF ROUSSILLON, FRANCE, ASSIGNOR TO E. I. DU PONT DE NEMOURS & COMPANY, OF WILMINGTON, DELAWARE

PROCESS FOR THE MANUFACTURE OF SHEETS OF DECORATED PLASTIC MATERIAL

Application filed July 24, 1929, Serial No. 380,776, and in France July 25, 1928.

The present invention concerns a process of manufacture of sheets of decorated plastic material. This process is applicable to all the plastic materials capable of being worked under a press, for example to plastic materials the basis of which is cellulose acetate, nitro-cellulose or other cellulosic derivatives. The raw materials used are sticks and, if desired, sheets of plastic materials; the sticks may be of circular or any other section; the sticks and the sheets may be coloured, transparent or opaque. The desired decorative effects are obtained, in accordance with the invention, by combining sticks and if desired, sheets, of different nature in respect of their colour and particularly their section.

According to the present invention, I provide a process of manufacture of sheets of decorated plastic material, which consists in arranging sticks of different kinds in a parallel manner, in rows, in interposing, if desired, sheets between the rows of sticks, and in welding the whole together by pressure in such a manner as to obtain a block, in cutting this block in parallelopipedon shaped pieces by means of equidistant cuts made in a direction perpendicular to that of the sticks and, if desired, by sections made in a direction parallel to that of the sticks, in assembling by pressure these parallelopipedon shaped pieces, with the faces, which are parallel to the direction of the sticks, put together, so as to obtain a block then cutting this block perpendicularly to the direction of the sticks.

The invention may be carried out as follows:

The sticks of various kinds are placed parallel to each other in rows, with sheets of plastic material interposed, if desired, between the rows of sticks, and the whole is welded by pressure so as to obtain a block. This block is then cut into strips by equidistant cuts made in a direction perpendicular to the direction of the sticks, and, if desired these strips are divided by cuts made in a direction parallel to the direction of the sticks. In this manner parallelopipedon shaped pieces are obtained, the two faces of which, perpendicular to the direction of the sticks, show a decoration which is governed by the arrangement of the sticks and of the sheets (if any), before being pressed together. These pieces are then put edgewise with their faces parallel to the direction of the sticks in contact, and assembled together by pressure. By operating in this manner, the faces of the parallelopipedon shaped pieces perpendicular to the direction of the sticks are brought in two parallel planes constituting the faces of the block so obtained. This block is finally cut perpendicularly to the direction of the sticks and in this manner sheets which are decorated throughout their mass are obtained.

Here are, as example, two methods of carrying out the process.

Figure 2:
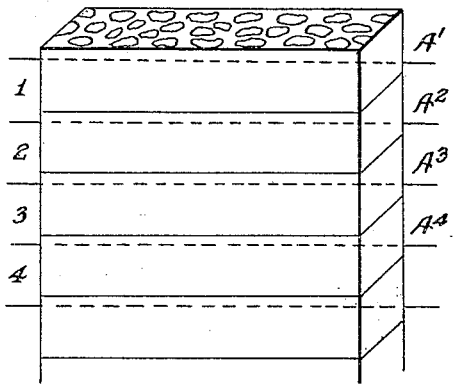
Figure 3:
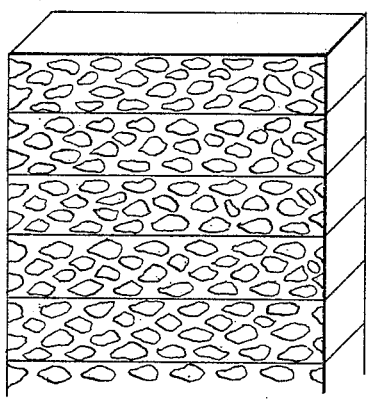
Figure 4:
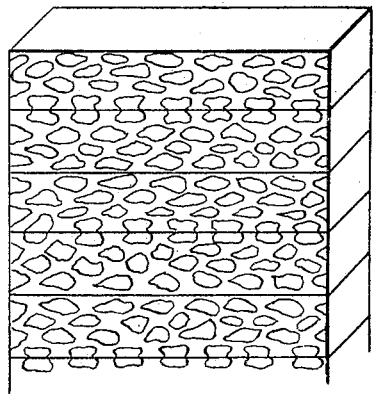

*Example 1.*—Sticks of plastic material with a basis of cellulose acetate are disposed quincuncially between sheets of plastic material the basis of which is cellulose acetate, as shown on Figure 1. These sticks and these sheets still contain a sufficient percentage of solvent to allow them to be shaped. The whole is put into a press; in this manner a block is obtained diagrammatically represented in Figure 2. This block is cut in a direction perpendicular to the direction of the sticks into parallelopipedon shaped strips, a few centimetres in width, numbered 1, 2, 3, 4, on Figure 2. These strips are placed edgewise by turning the strip No. 1 through 90° about its axis $A^1$, the strip No. 2 through 90° through its axis $A^2$ . . . etc., and the whole is placed into a press so as to obtain a new block. The strips may be turned in the same direction or first in one direction and then in the other, alternately. In the first case the block represented diagrammatically on Figure 3 is obtained by pressing, in the second case the block shown diagrammatically on Figure 4 is obtained. These blocks are afterwards cut in sheets perpendicularly to the direction of the sticks. These sheets exhibit a pattern which, in the case of the block shown on Figure 4, has a certain symmetrical character. It will be understood that, by modifying the mode of assembling the strips put edgewise it is possible to obtain varied decoration effects.

Figure 5:
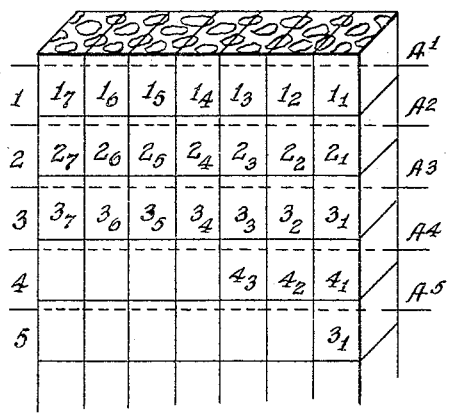
Figure 6:
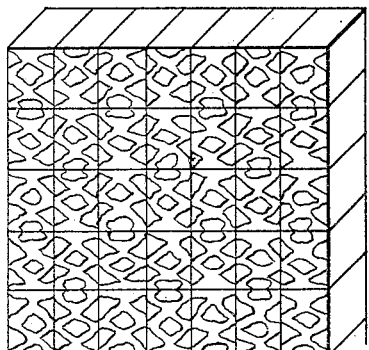

*Example 2.*—One proceeds as in Example 1, up to the obtainment of the strips. These strips are then cut into parallelopipedon shaped pieces of equal size by cuts made in a direction parallel to that of the sticks, as indicated on Figure 5, where these pieces are numbered $1^1$, $1^2$, ... etc., $2^1$, $2^2$, ... etc. These pieces are placed edgewise as follows: the pieces $1^1$, $1^3$, $1^5$ ... are turned through 90° in one direction about the axis $A^1$, the pieces $2^2$, $2^4$, $2^6$ are turned through 90° in the same direction about the axis $A^2$ ... etc.; the pieces $1^2$, $1^4$, $1^6$ are turned in the opposite direction through 90° about the axis $A^1$, the pieces $2^1$, $2^3$, $2^5$ ... are turned through 90° about the axis $A^2$ etc. The whole is put into a press, and the block obtained, shown diagrammatically in Figure 6, is cut in sheets perpendicularly to the direction of the sticks. These sheets have a pronounced symmetrical character.

It will be understood that by putting the pieces edgewise together in a different manner, varied decorative effects can be obtained. It is also possible to cut the pieces $1^1$, $1^2$ ... $2^1$, $2^2$ ... so that they have unequal lengths, which allows other effects to be obtained.

These two examples put in evidence the principal advantages which the new process offers, namely, the facility of execution and the possibility of obtaining decorative effects which are extremely varied, since the decoration of the sheets obtained depends from a large number of factors which can be varied independently.

What I claim and desire to secure by Letters Patent is:—

1. A process for the manufacture of decorated sheets which comprises arranging in parallel rows a plurality of variously colored and shaped sticks of a plastic material containing a cellulose derivative as its base and a sufficient amount of solvent to permit shaping, subjecting said mass to pressure, cutting the resultant block equidistantly in a direction perpendicular to the sticks to produce parallelopipedon shaped pieces, arranging said parallelopipedon shaped pieces with the faces together which are parallel to the sticks, subjecting said mass to pressure, and cutting the block perpendicular to the direction of the sticks.

2. A process for the manufacture of decorated sheets which comprises arranging in parallel rows a plurality of variously colored and shaped sticks of a plastic material containing a cellulose derivative as its base and a sufficient amount of solvent to permit shaping, interposing between said rows sheets of a plastic material similar to said sticks, subjecting said mass to pressure, cutting the resultant block equidistantly in a direction perpendicular to the sticks to produce parallelopipedon shaped pieces arranging said parallelopipedon pieces with the faces together which are parallel to the sticks, subjecting said mass to pressure, and cutting the block perpendicular to the sticks.

In testimony whereof I have signed my name to this specification.

JULES ALBERT RENOUPREZ.